United States Patent Office 2,695,291
Patented Nov. 23, 1954

2,695,291

POL-ALKOXY-MORPHOLINIUM ALKYL SULFATES

Joseph B. Niederl and Martin E. McGreal, Brooklyn, N. Y., and William F. Hart, Easton, Pa., assignors to J. B. Niederl & Associates, Inc., New York, N. Y., a corporation of New York No Drawing. Application May 17, 1950,
Serial No. 162,612

9 Claims. (Cl. 260—247.1)

This invention relates to water soluble condensation products of ethylene oxide and morpholine. More specifically this invention relates to water soluble condensation products produced by reacting ethylene oxide with morpholine under pressure and quaternizing the resulting tertiary amine. The intermediate tertiary amine, usually possesses a hydrophylic side chain of from 3 to 6 ethoxy groups. The tertiary amine is then converted into quaternary morpholinium alkyl sulfates, by reacting it with either symmetrical or unsymmetrical alkyl sulfates, yielding compounds possessing the following general formula:

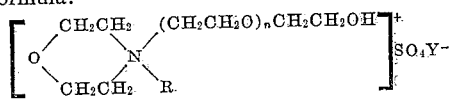

in this formula R and Y are alkyl radicals of from 1 to 18 carbon atoms, which may or may not be the same and $n$ is from 3 to 6.

The prime purpose of this invention is the creation of long chain quaternary ammonium alkyl sulfates of high water solubility. For instance, in quaternary ammonium compounds in which R consists of 16 or more carbon atoms water solubility is very low, thus materially decreasing the usefulness of these compounds. The same situation prevails in cases where Y is of about the same magnitude. It is the precise purpose of this invention to overcome this difficiency and make these desirable compounds available for various practical and industrial uses. The uses comprise the usual applications of quaternary ammonium compounds, such as for emulsifying and detergent purposes, flotation processes, lubrication problems in the textile industries as deodorants, general types of cleansers and for softening compositions.

The chemicals used in the present invention are ethylene oxide

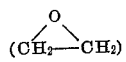

morpholine ($O:(CH_2CH_2)_2:NH$), symmetrical as well as unsymmetrical alkyl sulfates. The symmetrical alkyl sulfates comprise compounds of the formula:

$$(CH_3)_2SO_4 \text{ to } (C_{18}H_{37})_2SO_4$$

and include the entire homologous series starting with dimethyl sulfate to di-octadecyl sulfate inclusively. The higher homologs of these series are prepared as described by Barkenbus and Owen (Journ. Am. Chem. Soc., vol. 45, pp. 1204 (1934) and as utilized by the present inventors in their publication in the Journal of the Am. Chem. Society, vol. 71, p. 3569 (1949).

The unsymmetrical di-alkyl sulfates comprise chiefly compounds of the general formula

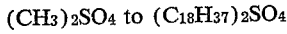

They are the homologs of methyl-ethyl sulfate, most important of which are methyl-lauryl sulfate, methylmyristyl sulfate and methyl cetyl sulfate. These last mentioned unsymmetrical methyl sulfates are prepared according to Bushong (Am. Chem. Jour., vol. 30, pp. 212 (1903) and their utilization in quaternization reactions has been demonstrated by the present inventors in their paper in the Journal of Org. Chem., vol. 14, pp. 579 (1949).

*Example 1.—Preparation of N-ethylol-poly-ethoxy-morpholines*

One mol of morpholine is introduced into a suitable sized pressure vessel and heated to a temperature of 110° C. Ethylene oxide is then introduced into the reaction vessel in such a manner that the pressure produced does not exceed 80 lbs. per square inch. A total of 4 mols of ethylene oxide is used. The reaction is usually finished after about 3½ hours. After exhaustion of the ethylene oxide, as indicated by a drop in the pressure, the reaction mixture is allowed to cool. After this, the condensation product is transferred to a vacuum still and heated to 100° C. for about ½ hour, while the pressure is reduced to about 10 mm. to remove any unreacted morpholine, ethylene oxide and low boiling by-products.

The crude product thus produced, boils at a temperature of from 235–330° C. at ordinary pressure. The portion boiling from 160–200° C. at 1 mm. proved to be the desired product, corresponding to the following formula:

The distilled product is a nearly colorless liquid, extremely soluble in water, its aqueous solutions exhibiting capillary activity. Its salts, such as the hydrochloride, sulfate and oxalate are also very soluble in water. The product is precipitated from tis aqueous solutions with picric acid, the resulting picrate melts at 156–158° C.

Increasing the amount of ethylene oxide to 5 mol equivalents and retaining identical reaction conditions the N-ethylol-tetra-ethoxy-morpholine (B. P. 200–230° C./1 mm.) is produced, while an increase of ethylene oxide to 6 and 7 mols respectively produces the corresponding N-ethylol-penta-ethoxy-morpholine (B. P. 230–250° C./1 mm.) and the N-ethylol-hexa-ethoxy-morpholine (B. P. 250–275° C./1 mm.) respectively. Any of these poly ethoxy morpholines may be used in the quaternization reactions given below.

*Example 2.—Preparation of N-methyl-N-ethylol-tri-ethoxy-morpholinium methyl sulfate*

The N-methyl - N - ethylol - tri - ethoxy - morpholinium methosulfate is prepared by dissolving one mol of N-ethylol-tri-ethoxy-morpholine in 500 ml. of ethyl acetate and cooling the resulting solution externally with ice. One mol of dimethyl sulfate is then added in small portions in such a manner that the temperature of the reaction mixture never rises above 5° C. The quaternary methosulfate gradually separates out in form of a heavy, viscous oil. The reaction is quantitative. The compound is purified by repeated washing with warm ethyl acetate, followed by cooling.

The N-methyl - N - ethylol - tri - ethoxy - morpholinium methosulfate is extremely soluble in water and shows high alkali and acid stability and compatibility, while its aqueous solution exhibits capillary activity. The product is also very soluble in methyl- and ethyl alcohol, but is only sparingly soluble in hydrocarbons, ethers and esters.

The picrate, formed by the addition of picric acid to its aqueous solution melts at 187–190° C., while its iodide, produced similarly by treating its aqueous solutions with potassium iodide, melts at 134–138° C.

Other similar types of quaternary morpholinium compounds, such as the N-benzyl-N-ethylol-tri-ethoxy-morpholinium chloride and the N-methyl-N-ethylol-tri-ethoxy-morpholinium iodide are produced by refluxing the N-ethylol-tri-ethoxy-morpholine with equimolar quantities of benzyl chloride in toluene solution, or with an excess of methyl iodide and purifying the reaction product in a similar manner as in the case of the methosulfate.

*Example 3.—Preparation of N-methyl-N-ethylol-tetra-ethoxy-morpholinium cetyl sulfate*

One mol of N-ethylol-tetra-ethoxy-morpholine is mixed with one mol of methyl-cetyl sulfate. The mixture is then heated for four hours in a closed container on a steam bath. After this time, the reaction mixture is cooled and is then treated with 500 cc. of ether or ethyl acetate. The mixture is allowed to settle and the supernatant liquid either decanted, or drawn-off. The washing is repeated. The residue, a semi-solid, may be further purified by crystallization, or precipitation from hot ethyl acetate. The final product, the N-methyl-N-ethylol-tetra-ethoxy morpholinium cetyl sulfate, is water soluble and exhibits surface active properties.

Substitution of methyl-lauryl sulfate, methyl-myristyl-sulfate or methyl-octadecyl sulfate, for the methyl-cetyl sulfate in the above example, leads to the formation of the corresponding N-methyl-N-ethylol-tetra-ethoxy-morpholinium lauryl-; myristyl and octadecyl sulfates respectively. All these products show similar physical properties.

*Example 4.—Preparation of N-cetyl-N-ethylol-penta-ethoxy-morpholinium cetyl sulfate*

Equimolar quantities of N-ethylol-penta-ethoxy-morpholine and di-cetyl sulfate are introduced into a suitable round bottomed flask provided with a reflux condenser. To this mixture are added 500 cc. of toluene. After thorough mixing, the contents are heated to 110–120° C. for six hours. After this time, the toluene is distilled off under reduced pressure and the residue is treated with 500 cc. of ether or ethyl acetate. The ether or the acetate is removed by decantation or syphoning. This procedure is repeated. Finally the reaction product is further purified by crystallization or precipitation from hot ethyl acetate. The final reaction product, the N-cetyl-N-ethylol-penta-ethoxy-morpholinium cetyl sulfate is a low melting wax, soluble in water and exhibits detergent qualities.

Instead of the di-cetyl sulfate used in the above example, other higher sulfates, either symmetrical or unsymmetrical, can be used particularly those in which the hydrocarbon radicals contain from 12 to 18 carbon atoms. For example, di-lauryl sulfate, di-myristyl sulfate or di-octadecyl sulfate can be used, according to the procedure of Example 4, to produce the corresponding N-lauryl-N-ethylol-penta-ethoxy-morpholinium lauryl sulfate, the N-myristyl-N-ethylol-penta-ethoxy-morpholinium myristyl sulfate, and the N-octadecyl-N-ethylol-penta-ethoxy-morpholinium octadecyl sulfate, which are similar in chemical and physical properties to the cetyl derivative of the example.

We claim:

1. Quaternary morpholinium alkyl sulfates possessing the following structure:

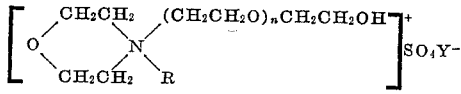

in which R and Y are continuous carbon chains of from 1 to 18 carbon atoms, and where $n$ is from 3 to 6.

2. Quaternary morpholinium alkyl sulfates possessing the following structure:

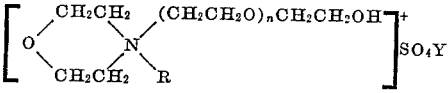

wherein R and Y are continuous carbon chains of from 12 to 18 carbon atoms and $n$ is from 3 to 6.

3. The compound N-methyl-N-ethylol-tri-ethoxy-morpholinium methosulfate.

4. The compound N-methyl-N-ethylol-penta-ethoxy-morpholinium methosulfate.

5. The compound N-methyl-N-ethylol-tetra-ethoxy-morpholinium cetyl sulfate.

6. The compound N-lauryl-N-ethylol-penta-ethoxy-morpholinium lauryl sulfate.

7. The compound N-cetyl N-ethylol-penta-ethoxy-morpholinium cetyl sulfate.

8. The process for producing quaternary morpholinium alkyl sulfates which comprises reacting morpholine with from 4 to 7 mols of ethylene oxide and thereafter quaternizing the resulting tertiary amine by reaction with a dialkyl sulfate wherein the alkyl groups are continuous carbon chains of from 1 to 18 carbon atoms each.

9. The process for producing a quaternary morpholinium alkyl sulfate which comprises reacting morpholine with from 4 to 7 mols of ethylene oxide and thereafter quaternizing the resulting tertiary amine by reaction with a dialkyl sulfate wherein the alkyl groups are hydrocarbon radicals having from 12 to 18 carbon atoms each.

References Cited in the file of this patent

UNITED STATES PATENTS

| Number | Name | Date |
|---|---|---|
| 2,581,285 | Niederl et al. | Jan. 1, 1952 |